United States Patent [19]

Roestenberg

[11] Patent Number: 4,800,054

[45] Date of Patent: Jan. 24, 1989

[54] METHOD FOR SHAPING A MOLDING COMPOUND APPLIED TO A SURFACE FOR MODIFYING THE SURFACE

[76] Inventor: Jerome R. Roestenberg, 11 Woodpecker La., Levittown, N.Y. 11756

[21] Appl. No.: 58,436

[22] Filed: Jun. 5, 1987

[51] Int. Cl.⁴ ............. B28B 11/18; B29C 37/02; B32B 35/00
[52] U.S. Cl. ......................... 264/86; 156/94; 264/36; 264/161; 264/162; 264/316; 425/11; 425/12; 425/84; 425/89
[58] Field of Search ............. 264/36, 86, 161, 162, 264/313, 316; 156/94; 425/11, 12, 84, 89, DIG. 29, DIG. 44

[56] References Cited

U.S. PATENT DOCUMENTS

| | | | |
|---|---|---|---|
| 1,096,112 | 5/1914 | Kush | 156/94 |
| 1,621,000 | 3/1927 | Crowley | 264/161 |
| 1,638,529 | 8/1927 | Cook | 264/162 X |
| 1,882,191 | 10/1932 | Purinton | 264/86 |
| 2,364,388 | 12/1944 | Purinton et al. | 264/161 X |
| 2,651,079 | 9/1953 | Michaelson et al. | 264/162 |
| 2,671,933 | 3/1954 | Nye | 264/161 |
| 2,733,493 | 2/1956 | Bryer | 264/86 |
| 3,295,205 | 7/1967 | Sjöholm | 264/86 X |
| 3,437,548 | 4/1969 | Ayers | 264/162 X |
| 3,514,857 | 6/1970 | Rossen . | |
| 3,669,813 | 6/1972 | Andrea . | |
| 3,949,040 | 4/1976 | Drab | 264/161 |
| 3,990,825 | 11/1976 | Pasch et al. | 264/161 X |
| 4,013,495 | 3/1977 | Golumbic | 264/36 X |
| 4,069,290 | 1/1978 | Pasch | 264/313 X |
| 4,089,919 | 5/1978 | Sanson | 264/313 X |
| 4,132,516 | 1/1979 | Story | 264/36 X |
| 4,133,913 | 1/1979 | Moore | 156/94 X |
| 4,148,122 | 4/1979 | Phillips et al. | 264/36 X |
| 4,181,547 | 4/1980 | Speer | 264/36 X |
| 4,235,005 | 11/1980 | James . | |
| 4,409,270 | 10/1983 | Faber et al. | 264/36 X |
| 4,496,500 | 1/1985 | Haber . | |
| 4,497,662 | 2/1985 | Chisholm et al. | 264/36 X |
| 4,527,783 | 7/1985 | Collora et al. . | |
| 4,603,462 | 8/1986 | Kondo . | |

Primary Examiner—Jan H. Silbaugh
Assistant Examiner—Karen D. Kutach
Attorney, Agent, or Firm—Nolte, Nolte and Hunter

[57] ABSTRACT

A method for modifying a surface to a desired contour by pressing a flexible molding plate, having holes for releasing trapped fluids and excess molding compound, is pressed on a molding compound by a plurality of ordered pressure points which are set to define a shaped plane corresponding to a desired contour. The pressure points are adjustably included in a support frame, or are provided by shaped rollers. Compound extruded through the holes by the operation is removed from the plate which is then removed. Nubs resulting from excess molding compound in the holes are removed by sanding or other finishing means.

5 Claims, 5 Drawing Sheets

METHOD FOR SHAPING A MOLDING COMPOUND APPLIED TO A SURFACE FOR MODIFYING THE SURFACE

BACKGROUND OF THE INVENTION

1. Field of the Invention

The present invention relates in general to plastic and nonmetallic article shaping or treating, more particularly to a method for repairing and restoring a damaged area of a surface to a desired shape.

2. Description of the prior art

Repair or customizing of a selected area of an automotive vehicle body, usually requires building up the surface of the selected area with a molding compound or the like and then working or molding the compound to establish the desired shape. This of course applies to surfaces requiring such repair or other items as well.

One way comprises applying molding compound to the dented or otherwise damaged surface to build it up higher than the desired contour, allowing it to harden, then planing it down to the desired contour. This way results in a rough surface, possibly with pullout of the almost finished compound surface, and broken planer blades from inadvertent contact with the adjacent surface. Moreover the desired surface is obtained at relatively high cost by sculpturing, which requires a worker with special skill.

Another way, described in U.S. Pat. No. 4,496,500, issued to A. Haber, comprises the method of applying a molding compound, then while it is partially hardened, shaving it away by moving a saw-toothed blade back and forth across the area which received the compound, as it is advanced over the area,. The blade is bent to the desired contour and allowed to bridge over to the undamaged surface adjacent to the area for receiving, so that the desired overall contour is achieved.

Still another way, described in U.S. Pat. No. 3,669,813, issued to A. Andrea, comprises applying a rigid mold to the soft The mold comprises a shaped molding member having a surface corresponding to the desired contour, in which the member has mating recesses and extensions for joining it with other members to form a rigid mold for conforming the molding compound to the desired surface configuration. Only little sanding is required afterwards.

These and other apparatus and methods currently known or in use are generally costly to operate. They either do not easily provide, or are not suitable to economically provide, a wide range of contours.

SUMMARY OF THE INVENTION

It is one object of the invention to lower the cost of molding a desired contour on a surface.

It is another object of the invention to provide, on a molding compound, a molded surface which closely approaches a desired contour.

It is another object to provide an apparatus and method for obtaining the desired contour with minimum operator skill.

Another object is to provide a contoured molded surface that requires little post finishing.

Other objects and advantages will become apparent from the ensuing description.

In one broad aspect, the invention provides a mold plate or film having holes formed through it, which is placed over and pressed down on the molding compound to conform the outer surface of the molding compound to the desired shape of the area over which the compound is applied, e.g., the shape of the area before damage. As the plate is pressed on the compound, the gases and molding compound extrude through the holes in the mold plate or film. When the compound is partially cured; i.e., nearly cured, but still a bit pliable, the plate may then be removed, the compound allowed to fully cure and then the protrusions resulting from the extrusion of the compound through the holes are sanded away. Far less sculpturing, via sanding, scraping or otherwise is necessary.

In accordance with the present invention, there is provided a support frame which is positioned on a vehicle, over a selected area containing a surface for modification, and attached to the vehicle's surface outside the surface for modification, by suction cups, clamps, magnets or other means. The frame is adjustable, and includes pad grid rods. Depth rods, are adjustably attached to the pad grid rods, and provide a plurality of ordered pressure points through attached pressure pads which may be set to define a shaped plane corresponding to the desired contour.

Flexible mold plates, made from stainless steel, plastic or other suitable material, include holes for releasing trapped fluids, including gasses generated by curing molding compound, air trapped under the mold plate, excess molding compound, and liquids escaping from the molding compound if disproportionately mixed with thinner. A release agent is included on the mold surface, if required to separate the mold plate from the molding compound.

As part of a repair or customization procedure, molding compound is applied to the surface for modification, in sufficient quantity to provide the desired contoured finished surface. The mold plate, backed up by the plurality of pressure points for forming it to the desired contour, forms the molding compound surface to closely approach the desired contour. The mold plate is removed, and the resulting surface is sanded to prepare it for painting.

If a mold plate with large holes is used, compound which extrudes through the holes is removed before the plate is removed from the compound. This is because the plate is quite thin, and removing the extruded material leaves little within the plate's holes that would impede its removal from a partially or fully hardened compound.

In another embodiment, the plate includes trapezoidal holes obtained by weaving strands of flexible material to make the plate.

An intermediate porous film may be provided between the plate and the molding compound in order to facilitate release and to help keep the reusable plate clean.

BRIEF DESCRIPTION OF THE DRAWINGS

The invention will now be described, by way of example, with reference to the following drawings in which like elements have the same numeral.

Figure 1:
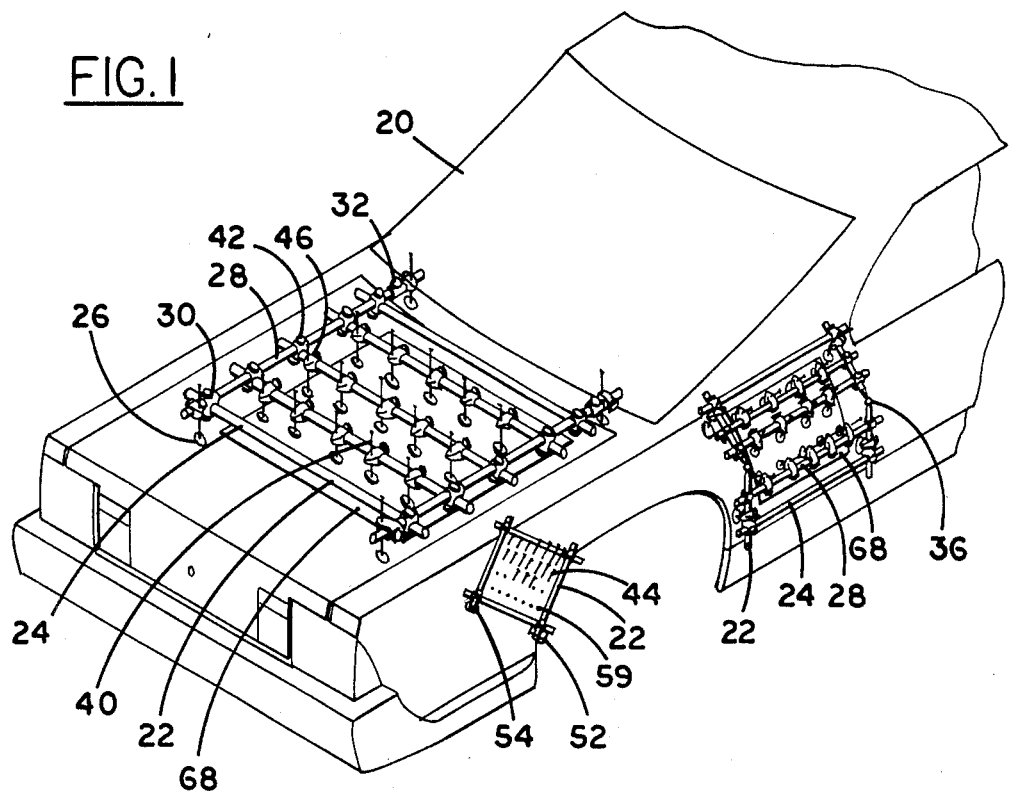
FIG. 1 is a representative view of frame assemblies of the invention. Each is attached to the front surface of an automobile panel in a selected area that includes a surface for modification.

The invention will now be described in detail, wherein it should be understood that phraseology or terminology employed, and arrangement of parts illustrated in the drawings is for the purpose of description only and not of limitation.

FIG. 1 is a representation showing a vehicle 20 with various frame assemblies of the invention attached to its trunk lid and quarter panel surfaces. Each frame is attached in a selected area that includes a surface for modification. Details of the components of the assembly may be seen in FIGS. 2, 3 and 4.

Support frame 24, positioned over a selected area, is held in place by suction cups 26. Support frame 24 comprises three or more support bars 28, connected and fastened to each other by corner clamp 30. Some bars telescope for adjustability in length, and are lockable at a desired length by length lock 32. Generally, a frame is designed to be completely adjustable, and can include various aids for that purpose including: 2-axis corner clamp 34, locking universal joint 36 and locking ball joint 38.

Figure 3:
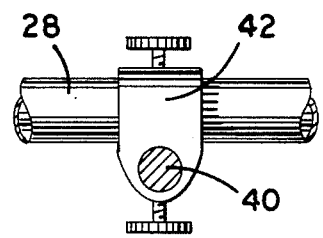
FIG. 3 is a detail view of a pad grid rod lock used for supporting a pad grid rod on a support frame bar.
Figure 4:
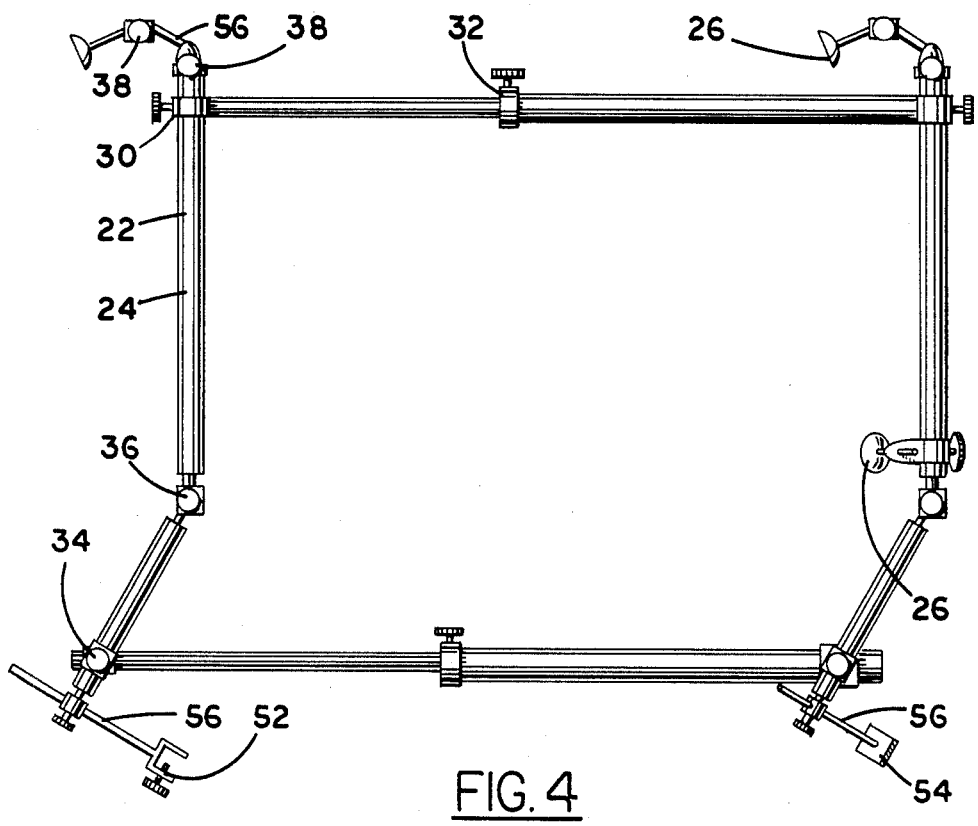
FIG. 4 is a schematic view showing a support frame with various means for attaching the frame to a vehicle surface adjacent to the surface for modification.

Running across the support frame are pad grid rods 40, each attached to the support bar by a pad grid lock 42 as may be noted in FIG. 3.

Figure 2:
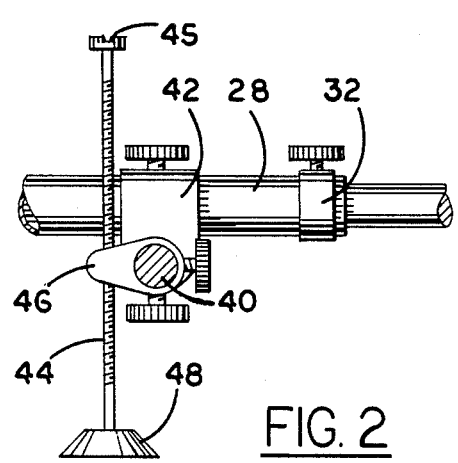
FIG. 2 is a view of an adjustable depth rod attached to a pad grid rod which is attached to a support frame bar.

In FIG. 2, the pad grid lock is not shown in order to more clearly show another element in the frame assembly, depth rod 44, attached to pad grid rod 40 by lockable depth set fixture 46. Depth rod 44 shown in FIG. 2 is threaded for easy and precise adjustability and includes screw driver slot 45 at its top end. At the lower end of depth rod 44, is located pressure pad 48.

Figure 5:
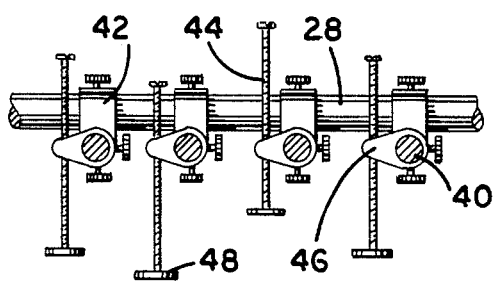
FIG. 5 is a schematic view of a support frame with a row of pad grid rods.

FIG. 5 shows a series of parallel pad grid rods seen on end, with the closest to viewer pressure pad 48 and depth rod 44 mounted on each by means of lockable depth set fixture 46.

The frame assembly provides an ordered system for aligning a plurality of pressure pads so that their surfaces locate on points of a plane that duplicates the desired shape of the molded surface to be produced. The frame is mounted to the surface of the vehicle, by any practical attachment means including those shown in FIG. 4, such as suction cup 26, body clamp 52, and magnet 54, mounted on frame legs 56. Most of the adjustable parts of the assembly include locking means, so that positioning of the pressure pads is stable. The points on a plane that they provide, are to remain constant against pressures tending to displace them.

Figure 6:
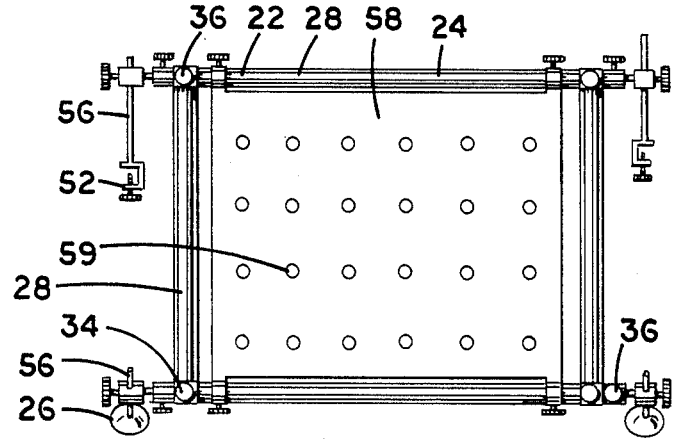
FIG. 6 is a schematic view of a support frame of another embodiment of the present invention, with threaded grid for threaded grid rods.

Frame assembly 22 shown in FIG. 6 is of more permanent construction, used for modifying small surfaces in selected areas. Support bars 28 are rigidly attached to each other, and hold grid 58 having holes 59 threaded for receiving threaded depth rods with pressure pads not shown. The depth rods are screwed up or down to set the height of each pressure pad so that their surfaces locate on points of a plane that duplicates the desired shape of the molded surface to be produced. Locking universal joints 36 for orienting frame legs 56 facilitate secure fastening of the frame to vehicle's surface by clamp, magnet and suction cup. Note the threaded grid assembly mounted above the wheel well on the vheicle in FIG. 1.

Figure 7:
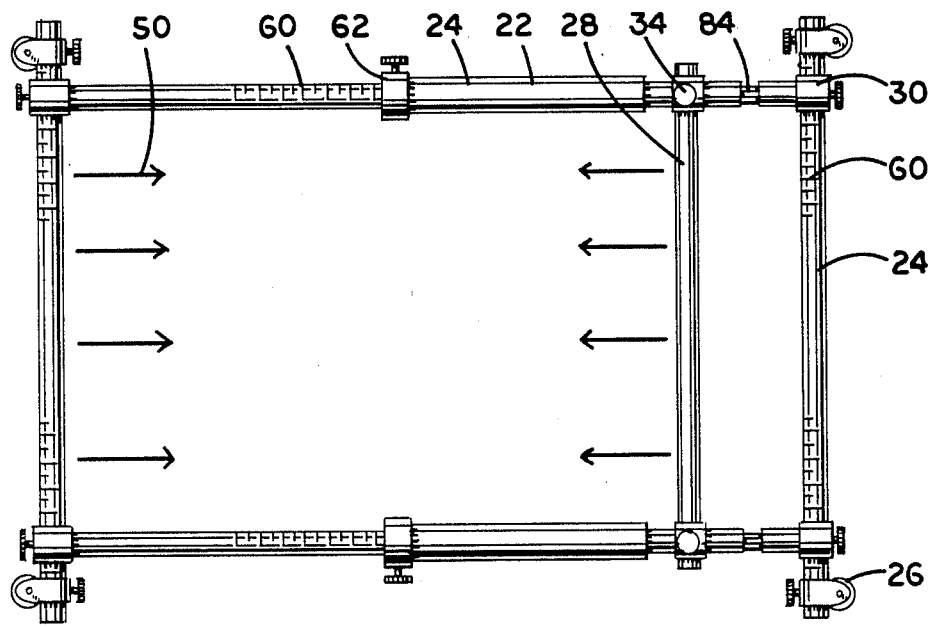
FIG. 7 is a schematic view of a fold-up adjustable support frame.

Support frame 24 shown in FIG. 7 has a minimum number of elements, rigidly locked together. Each adjustable part of the frame includes a scale 60, so that the assembly is repeatable. The frame legs are permanently fixed to the frame and the suction cups are screw adjustable (not shown). Support bars 28 are flat on the bottom, or otherwise keyed to resist rotation, and locked by collars 62. Pad grid rod orientation is represented by arrows 50. This very rigid support frame provides a repeatable base for establishing pressure pad alignment, and may be rotated up on hinges 84, to work on the surface below. An auxiliary support bar 28, holds the grid frame at its end near hinges 84.

An ordered system for providing a plurality of pressure points is not limited to one of frame assemblies. Shaped roller 64, FIG. 8, for example, provides as it rolls, an aligned plurality of pressure points on line-contact which define a curved plane shape as they progress.

Figure 8:
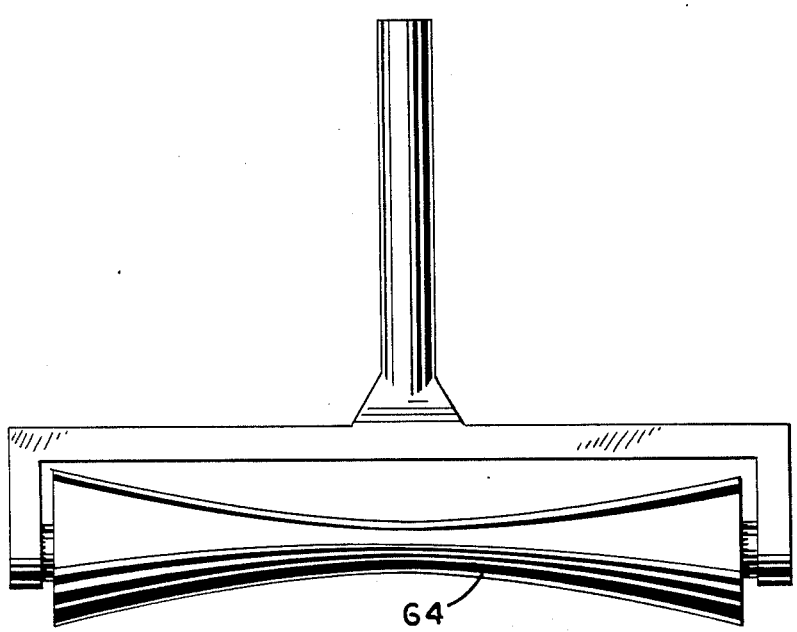
FIG. 8 is a schematic view of a shaped roller of another embodiment of the present invention, for providing a plurality of pressure points.
Figure 14:
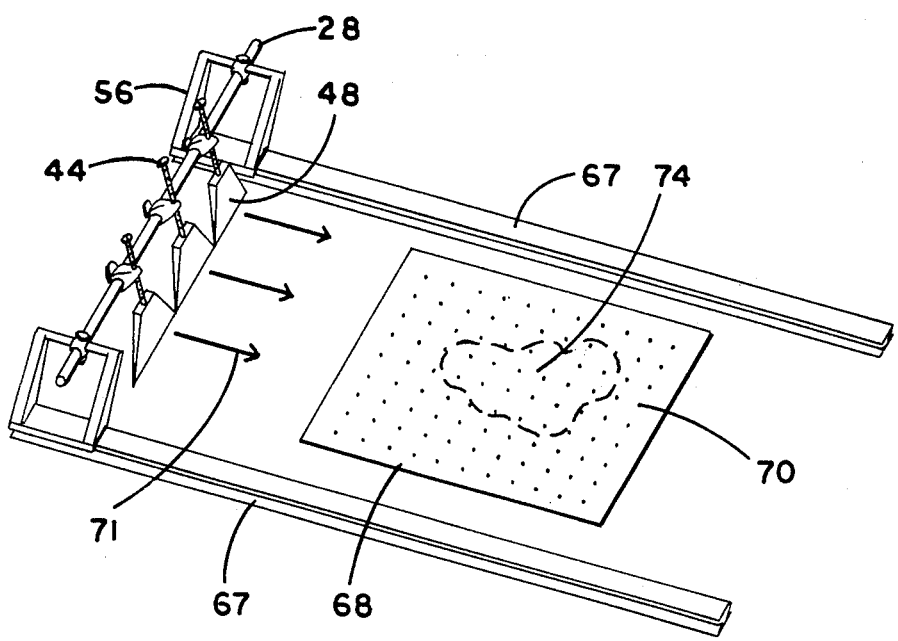
FIG. 14 is a schematic view of an embodiment of the invention showing a movable pressure point assembly.

In another embodiment, shown in FIG. 14, the ordered system for providing a plurality of pressure points includes means for applying the pressure points at locations across mold plate 68, which is located over surface for modification 74 (shown by hidden lines), by line-contact pressure pads 48 which are movable over the mold plate. Line contact pressure pads 48, which may comprise shaped rollers similar to the roller shown in FIG. 8, are supported on depth rods 44, which are in turn attached to support bar 28 as explained earlier and shown in FIG. 3. Alternatively, a single rod or a shaped roller is used in place of the pressure pads 48 (not shown) for applying the pressure across the mold plate as it is moved over the plate. Frame legs 56 slideably engage tracks 67 for movement of the pads across the mold plate as shown by direction arrows 71. Tracks 67 are magnetically attached to the vehicle's surface, or may be taped to it. It is to be understood that rollers or other means for lowering frictional resistance to sliding may be employed between the frame legs and the slides.

Pressure pads 48, being in line-contact, and moving across the mold plate, also serve to remove excess molding compound from the upper surface of the mold plate by scrape effect, squeegee effect, or a combination of the two.

In a low cost embodiment (not shown), the mold plate is retained over the selected area by adhesion force of the molding compound, or the mold plate is made from a magnetic material so that it is attracted to the surface of the selected area, and the plurality of pressure points is provided by hand-held roller, rod, pressure pad or other means previously described.

The above ordered systems for providing pressure points as described above, are used with flexible mold paltes shown in the following figures.

Figure 9:
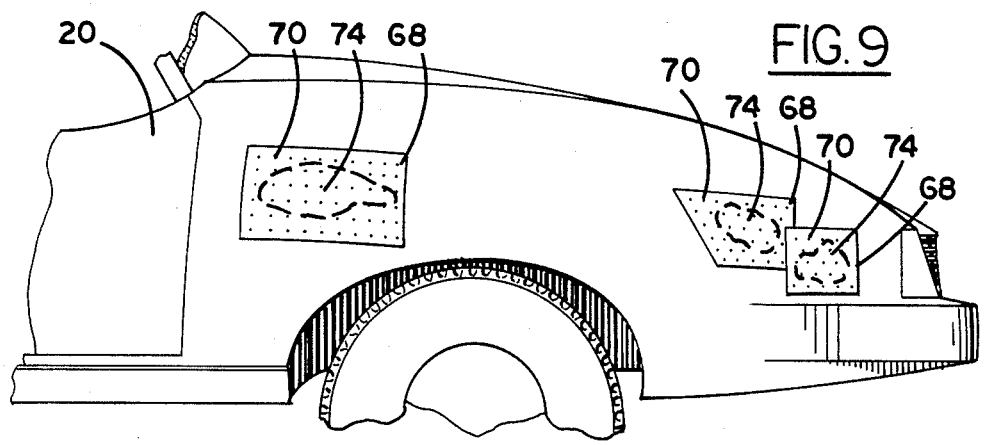
FIG. 9 is a schematic view of a fender with several shapes of mold plate mounted upon it.

Vehicle fender 66 in FIG. 9 has mounted upon it several shapes of mold plate 68. The plate includes holes 70 for releasing trapped fluids, including gasses generated by curing molding compound, air trapped under the mold plate as it is placed against the surface for receiving the molded surface, and liquids escaping from the molding compound. It is also within the contemplation of the invention for the holes to be large enough to allow molding compound to extrude through them.

The mold plates are located over selected areas that include surfaces for modification, which have dents, small holes, creases or other surface imperfections which lend themselves to repair by a covering, molded surface. The mold plate is formed to mimic the shape of the selected area that existed before that area obtained the imperfection. As shown in FIG. 9, a mold plate may be made from more than one overlapping flexible plate.

The flexible mold plates are made from any convenient material such as plastic, stainless steel or aluminum, and are reusable because they can be adjusted to other shapes as needed. Very thin plastic or paper mold plates may be discarded after use if deformed or otherwise rendered unusable. An intermediate may be used between the plate and molding compound to reduce sticking and promote easy release between the two for removal of the plate, and to contribute to plate cleanliness for its reuse. The intermediate should not prevent holes 70 from receiving fluids, gasses and molding compound from below the intermediate plate for release through the holes as explained earlier.

A thin, porous plastic or paper, or one that has holes in it that open variously to holes in the plate, may be used as an intermediate. It is also within the contemplation of the invention to use a mold release spray such as silicone or the like.

Figure 10:
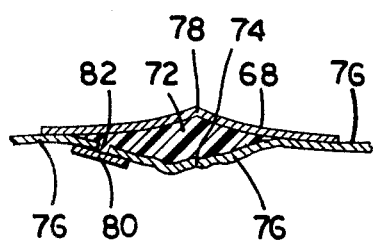
FIG. 10 is an edge view of a creased mold plate on the front of a panel, and a backing plate behind a leak hole, at the back of the panel.
Figure 11:
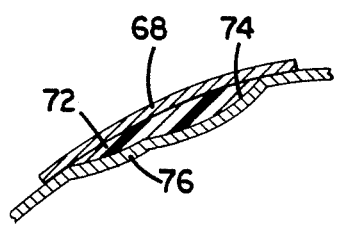
FIG. 11 is an edge view of a mold plate on a bowed panel.

Molding compound 72 in FIGS. 10 and 11 is seen in crosssection, to be located between mold plate 68 and the surface for modification 74, which is located on vehicle panel selected area 76.

Mold plates are flexible and are generally designed to have no memory, their ultimate shape being determined by pressure applied at the plurality of locations afforded by pressure pads. Crease 78 is included, however, in mold plate 68 shown in FIG. 10, to facilitate molding a ridge on the panel portion. Although the pressure pads will duplicate most shapes desired, abrupt changes in surface direction are more easily followed and duplicated when the mold plate includes them to some degree.

Backing 80, behind aperture 82 through surface for modification 74, as shown in FIG. 10, prevents loss of significant amounts of the molding compound by way of the rear of the surface for modification.

Figure 12:
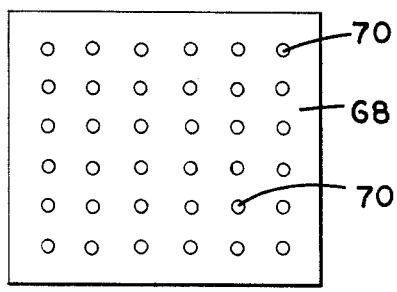
FIG. 12 is a schematic view of a mold plate with one type of holes.
Figure 13:
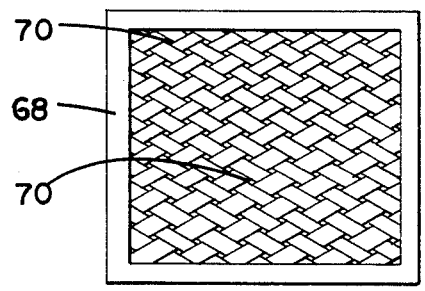
FIG. 13 is a schematic view of a mold plate with one type of holes.

FIGS. 12 and 13 show two types of holes 70 which may be formed in mold plates. The plate of FIG. 12 includes round holes obtained by punching or drilling, that of FIG. 13 includes trapezoidal holes obtained by weaving strands of flexible material.

In operation, molding compound is applied to the area in sufficient amount to fill any voids and irregularities and to provide sufficient compound to make the desired molded contour over the surface for modification.

The flexible mold plate is then placed over the selected area and pressure is applied on the mold plate at a plurality of locations to form the molding compound under the plate, by the shaped roller or the frame and pressure pad assembly.

In the step of applying pressure on the mold plate, the plate can be placed on the selected area first, followed by the preset frame and pressure pad assembly, or the plate can be positioned on the pressure pads whereby the pressure is applied by the pads, by way of the plate, to the molding compound, as the assembly is lowered or folded down on the selected area.

When the mold plate can be safely removed without the molding compound loosing its acquired contour, the plate is removed and the new molded surface is sanded or otherwise finished. Depending upon the type of holes in the mold plate, little nubs resulting from the compound left in the holes, are removed.

Although certain embodiments of the invention have been described in detail, it is not intended that those details are limitations upon the scope of the invention, which shall be limited by the following claims.

What is claimed is:

1. A method for modifying a surface within a selected area of a panel to a desired contour with a molding compound, the method comprising:
   (a) applying to the surface to be modified, a sufficient amount of molding compound to enable filling voids and irregularities in the surface and to enable making the desired contour,
   (b) locating a flexible mold plate, having a plurality of holes for releasing trapped fluids and molding compound through the mold plate, over the surface to be modified and the molding compound,
   (c) applying pressure on mold plate, at a plurality of locations for deforming the mold plate in the region of the locations into the desired contour while releasing fluids from the molding compound and excess molding compound through the holes, and for forming the molding compound under the mold plate into the desired contour,
   (d) removing the excess molding compound, and
   (e) when the molding compound is hardened sufficiently to retain the desired contour, removing the mold plate to provide a contoured molded surface which requires little post finishing.

2. The method as described in claim 1, wherein:
applying pressure at a plurality of locations deforming the mold plate in the region of the locations into the desired contour comprises applying the pressure in successive lines across portions of the mold plate with a shaped roller means.

3. The method as described in claim 1, wherein:
applying pressure at a plurality of locations for deforming the mold plate in the region of the locations into the desired contour comprises aligning a plurality of adjustable pressure pads so that their surfaces substantially locate on spaced points of a plane that duplicates the desired contour, then pressing the aligned pressure pads on the mold plate.

4. The method as described in claim 1, further comprising:
after applying pressure on the mold plate, removing excess molding compound which has extruded through the holes from the mold plate surface above the holes.

5. The method as described in claim 1 or 4, further comprising:
after removing the mold plate, removing surface irregularities resulting from molding compound which remained in the holes.

* * * * *

UNITED STATES PATENT AND TRADEMARK OFFICE
CERTIFICATE OF CORRECTION

PATENT NO. : 4,800,054
DATED : January 24, 1989
INVENTOR(S) : Jerome R. Koestenberg It is certified that error appears in the above-identified patent and that said Letters Patent is hereby corrected as shown below:

Column 6, line 32, after "on" insert --the--;

line 44, after "locations" insert --for--.

Signed and Sealed this

Thirteenth Day of June, 1989

Attest:

DONALD J. QUIGG

*Attesting Officer*           *Commissioner of Patents and Trademarks*